(12) United States Patent
Getson et al.

(10) Patent No.: US 10,685,572 B2
(45) Date of Patent: Jun. 16, 2020

(54) MULTI-LINK TRANSPONDER FOR AIRCRAFT AND METHOD OF PROVIDING MULTI-LINK TRANSPONDER CAPABILITY TO AN AIRCRAFT HAVING AN EXISTING TRANSPONDER

(71) Applicant: L3 AVIATION PRODUCTS, INC., Grand Rapids, MI (US)

(72) Inventors: Blake R. Getson, Columbus, OH (US); Gary S. Watson, Ada, MI (US); Lee R. Carlson, Grand Rapids, MI (US)

(73) Assignee: AVIATION COMMUNICATION & SURVEILLANCE SYSTEMS, LLC, Phoenix, AZ (US)

( * ) Notice: Subject to any disclaimer, the term of this patent is extended or adjusted under 35 U.S.C. 154(b) by 687 days.

(21) Appl. No.: 15/012,046

(22) Filed: Feb. 1, 2016

(65) Prior Publication Data

US 2016/0155336 A1    Jun. 2, 2016

Related U.S. Application Data

(63) Continuation of application No. 13/683,592, filed on Nov. 21, 2012, now Pat. No. 9,285,472.

(60) Provisional application No. 61/567,353, filed on Dec. 6, 2011, provisional application No. 61/600,013, filed on Feb. 17, 2012.

(51) Int. Cl.
*G08G 5/00* (2006.01)
*G01S 13/933* (2020.01)

(52) U.S. Cl.
CPC .......... *G08G 5/0008* (2013.01); *G01S 13/933* (2020.01); *G08G 5/0021* (2013.01); *G08G 5/0078* (2013.01)

(58) Field of Classification Search
CPC .......................... G08G 5/0008; G01S 13/9303
See application file for complete search history.

(56) References Cited

U.S. PATENT DOCUMENTS

| 5,208,591 | A | 5/1993 | Ybarra et al. |
| 5,280,285 | A | 1/1994 | Curtis et al. |
| 5,321,406 | A | 6/1994 | Bishop et al. |
| 5,420,582 | A | 5/1995 | Kubbat et al. |
| 5,570,095 | A | 10/1996 | Drouilhet, Jr. et al. |

(Continued)

OTHER PUBLICATIONS

Garmin GTN650 press release; Mar. 24, 2011.

*Primary Examiner* — Marcus E Windrich
(74) *Attorney, Agent, or Firm* — Dickinson Wright PLLC

(57) ABSTRACT

A transponder system that is adapted to be positioned in an aircraft includes a transponder that is adapted to transmit information pertaining to the aircraft in which the transponder is positioned includes at least one receiver that is adapted to receive information including information pertaining to another aircraft. The receiver(s) is adapted to receive different types of data on multiple different frequencies. A display, which may be integral with the system housing or remotely mounted, is adapted to display (i) information received by said receiver and/or (ii) information to guide user input selection of information transmitted by said transponder. The housing houses the transponder, the receiver and, in one embodiment, the display. The existing transponder in the aircraft can be removed thereby leaving an opening in the aircraft and the transponder installed in the opening.

28 Claims, 16 Drawing Sheets

(56) References Cited

U.S. PATENT DOCUMENTS

| | | |
|---|---|---|
| 5,867,535 A | 2/1999 | Phillips et al. |
| 6,057,786 A | 5/2000 | Briffe et al. |
| 6,154,151 A | 11/2000 | McElreath et al. |
| 6,202,026 B1 | 3/2001 | Nimura et al. |
| 6,262,679 B1 | 7/2001 | Tran |
| 6,271,768 B1 | 8/2001 | Frazier, Jr. et al. |
| 6,313,783 B1* | 11/2001 | Kuntman ............ G01S 13/76 342/29 |
| 6,389,355 B1 | 5/2002 | Gibbs et al. |
| 6,459,411 B2 | 10/2002 | Frazier et al. |
| 6,469,660 B1 | 10/2002 | Horvath et al. |
| 6,473,003 B2 | 10/2002 | Horvath et al. |
| 6,542,809 B2 | 4/2003 | Hehls, III |
| 6,542,810 B2 | 4/2003 | Lai |
| 6,545,631 B2 | 4/2003 | Hudson et al. |
| 6,567,037 B1 | 5/2003 | Fung et al. |
| 6,633,259 B1 | 10/2003 | Smith et al. |
| 6,653,948 B1* | 11/2003 | Kunimatsu ........ G01C 21/3647 340/995.16 |
| 6,683,562 B2 | 1/2004 | Stayton et al. |
| 6,690,296 B2 | 2/2004 | Corwin et al. |
| 6,696,980 B1 | 2/2004 | Langner et al. |
| 6,789,016 B2 | 9/2004 | Bayh et al. |
| 6,799,114 B2 | 9/2004 | Etnyre |
| 6,806,829 B2 | 10/2004 | Smith et al. |
| 6,810,322 B2 | 10/2004 | Lai |
| 6,876,906 B1 | 4/2005 | Zellers et al. |
| 6,957,130 B1 | 10/2005 | Horvath et al. |
| 6,958,130 B1 | 10/2005 | Gicquel et al. |
| 6,967,616 B2 | 11/2005 | Etnyre |
| 7,006,032 B2 | 2/2006 | King et al. |
| 7,043,355 B2 | 5/2006 | Lai |
| 7,095,360 B2 | 8/2006 | Kuji et al. |
| 7,123,192 B2 | 10/2006 | Smith et al. |
| 7,148,816 B1 | 12/2006 | Carrico |
| 7,194,342 B1 | 3/2007 | Horvath et al. |
| 7,268,702 B2 | 9/2007 | Chamas et al. |
| 7,307,549 B2 | 12/2007 | Firra |
| 7,308,343 B1 | 12/2007 | Horvath et al. |
| 7,312,725 B2 | 12/2007 | Berson et al. |
| 7,437,221 B2 | 10/2008 | Hardman et al. |
| 7,535,405 B2 | 5/2009 | Hunter |
| 7,551,120 B1 | 6/2009 | Bailley et al. |
| 7,570,178 B1 | 8/2009 | Whalen et al. |
| 7,570,214 B2 | 8/2009 | Smith et al. |
| 7,612,716 B2 | 11/2009 | Smith et al. |
| 7,698,025 B1* | 4/2010 | Cornell ................ G01C 23/00 244/75.1 |
| 7,755,532 B2 | 7/2010 | Dooley |
| 7,808,377 B2 | 10/2010 | Shafaat et al. |
| 7,880,667 B2 | 2/2011 | Lanzkron |
| 7,961,136 B2 | 6/2011 | Stefani et al. |
| 7,966,125 B2 | 6/2011 | Wipplinger et al. |
| 8,004,452 B2* | 8/2011 | Rolfe ................. G08G 5/0013 342/36 |
| 8,072,374 B2 | 12/2011 | Hovey |
| 8,102,301 B2 | 1/2012 | Mosher |
| 8,130,135 B2 | 3/2012 | Donovan |
| 8,279,108 B2 | 10/2012 | Nouvel et al. |
| 8,335,637 B2 | 12/2012 | Deurwaarder et al. |
| 2002/0011950 A1* | 1/2002 | Frazier ................ G01C 23/00 342/357.32 |
| 2002/0075179 A1* | 6/2002 | Hudson ................ G01S 13/765 342/30 |
| 2003/0233192 A1* | 12/2003 | Bayh ................... G01S 13/765 701/301 |
| 2007/0200741 A1* | 8/2007 | Hunter ................ H04B 1/0007 341/126 |
| 2008/0106456 A1 | 5/2008 | Ootomo et al. |
| 2009/0146875 A1 | 6/2009 | Hovey |
| 2009/0295621 A1 | 12/2009 | Kuji et al. |
| 2009/0322589 A1* | 12/2009 | Dooley ................ G01S 13/765 342/37 |
| 2010/0060510 A1 | 3/2010 | Nouvel et al. |
| 2010/0090882 A1 | 4/2010 | Donovan |
| 2010/0283661 A1 | 11/2010 | Strain et al. |
| 2011/0015852 A1* | 1/2011 | Blomenhofer ....... G08G 5/0052 701/120 |
| 2011/0090984 A1 | 4/2011 | Stayton |
| 2011/0148690 A1 | 6/2011 | Mosher |
| 2012/0001773 A1* | 1/2012 | Lyons ................. G01C 23/005 340/970 |
| 2012/0001788 A1 | 1/2012 | Carlson et al. |
| 2012/0038501 A1* | 2/2012 | Schulte ................ G01S 13/782 342/30 |
| 2013/0033387 A1 | 2/2013 | Trope |
| 2013/0141268 A1 | 6/2013 | Getson et al. |

\* cited by examiner

MULTI-LINK TRANSPONDER FOR AIRCRAFT AND METHOD OF PROVIDING MULTI-LINK TRANSPONDER CAPABILITY TO AN AIRCRAFT HAVING AN EXISTING TRANSPONDER

CROSS-REFERENCE TO RELATED APPLICATIONS

The present application is a continuation of U.S. patent application Ser. No. 13/683,592, filed on Nov. 21, 2012, which claims the benefit of U.S. provisional patent application Ser. No. 61/567,353, filed on Dec. 6, 2011, and U.S. provisional patent application Ser. No. 61/600,013, filed on Feb. 17, 2012, the disclosures of which are hereby incorporated herein by reference in their entirety.

BACKGROUND OF THE INVENTION

The present invention is directed to a transponder for an aircraft and method of providing additional transponder and receiver capability to an aircraft having an existing transponder. While the invention may be used to provide a variety of capabilities, it is particularly useful in providing automatic dependent surveillance broadcast (ADS-B) capability to aircraft having only a transponder.

Aircraft operating in the United States National Airspace System (NAS) will be required to be equipped with ADS-B output (ADS-B OUT). Each such ADS-B OUT equipped aircraft will broadcast its position and other information, typically on one of two frequencies. In addition to the airborne component, a network of ground stations is being installed throughout the United States. These ground stations will receive the ADS-B broadcasts from aircraft and rebroadcast that information on the other frequency. In addition, position reports from aircraft not broadcasting ADS-B messages, but which are transponder-equipped, will be broadcast from the ADS-B ground stations as traffic information system broadcast (TISB) messages.

As a result, aircraft equipped with only a transponder, such as a Mode S extended squitter or an air traffic control radar beacon system (ATCRBS), will need to be upgraded.

SUMMARY OF THE INVENTION

The present invention is directed to a multi-link transponder for an aircraft and method of providing multilink transponder capability to aircraft that minimizes the expense and need to interface with other equipment on the aircraft while adding additional capability to the aircraft avionics systems. It also has the potential to reduce weight of the aircraft.

A multi-link transponder system that is adapted to be positioned in an aircraft, according to an aspect of the invention, includes a transponder that is adapted to transmit information pertaining to the aircraft in which the transponder is positioned, a receiver that is adapted to receive information pertaining to another aircraft and a display. The display is adapted to display (i) information received by said receiver and/or (ii) information to guide user input selection of information transmitted by said transponder. A housing houses the transponder, the receiver and the display.

The existing transponder in the aircraft can be removed thereby leaving an opening in the aircraft with the multi-link transponder installed in the opening. The housing may be configured to fit within a common transponder slot in an aircraft cockpit. The display may coincide substantially with a side of the housing. The display may have a width-to-height aspect ratio that is greater than 1:1 and may be at least approximately 2:1. The display may include a touch screen.

The display may be configured to depict information received by the receiver on one side of the display and to depict information to guide user input selection of information transmitted by the transponder on another side of the display. The display may be configured to selectively display numeric entry keys when in a mode to receive user selection of information transmitted by the transponder. The numeric entry keys may extend lengthwise across the display when in this mode.

The receiver may be adapted to receive different types of data. The display may be configured to selectively depict the different types of data. The different types of data may include aircraft traffic information and/or weather information. The display may be configured to selectively depict information to guide user input selection of the type of received data for depiction on the display.

A wireless output may be provided to display information received by the receiver on a portable electronic device.

The transponder may be a Mode S extended squitter or an ATCRBS transponder. The receiver(s) may receive (i) ADS-B data, (ii) ADS-R data, (iii) TIS-B data and/or (iv) FIS-B data. The display may be configured to depict passive aircraft traffic information from (i) ADS-B data, (ii) ADS-R data and/or (iii) TIS-B data. An active aircraft traffic detector may be provided, and the display configured, to depict passive aircraft traffic information and/or active aircraft traffic from the active aircraft traffic detector.

A memory device may be provided to store terrain data and/or TAWS data and the display configured to display the received data and/or perform a TAWS alert function. The memory device may be integral with the system's controller or a separate memory device.

A global navigation system position source may be included.

A multi-link transponder system that is adapted to be positioned in an aircraft, according to another aspect of the invention, includes a transponder that is configured to transmit information pertaining to the aircraft in which the transponder is positioned and at least one receiver that is adapted to receive information pertaining to another aircraft. The receiver(s) is adapted to receive different types of data. A display output is adapted to output a display signal that depicts information received by the receiver(s).

A housing may house the transponder and receiver(s). The existing transponder in the aircraft can be removed thereby leaving an opening in the aircraft with the multi-link transponder installed in the opening. The housing may be configured to fit within a common transponder slot in an aircraft cockpit. The receiver(s) may include a frequency agile receiver that is adapted to receive the different types of data on more than one frequency.

The display output may be configured to selectively depict information received by the receiver(s). The receiver(s) may receive aircraft traffic information and/or weather information. A wireless output may be provided to supply display data received by the receiver(s) on a portable electronic device.

The transponder may be a Mode S extended squitter or an ATCRBS transponder. The receivers may include (i) ADS-B data, (ii) ADS-R data, (iii) TIS-B data and/or (iv) FIS-B data. The display output may be adapted to depict passive aircraft traffic information from (i) ADS-B data, (ii) ADS-R data, and/or (iii) TIS-B data. An active aircraft traffic detector may be provided to and the display configured to depict passive aircraft traffic information and/or active aircraft traffic from the active aircraft traffic detector.

A memory device may be provided to store terrain data and/or TAWS data and the display configured to display the received data and/or perform a TAWS alert function. The memory device may be integral with the system's controller or a separate memory device.

A global navigation system position source may be included.

A method, according to yet another aspect of the invention, includes removing an existing transponder and replacing the existing transponder with a multi-link transponder of the type set forth above. The multi-link transponder may be positioned in the opening left by removing the existing transponder.

These and other objects, advantages and features of this invention will become apparent upon review of the following specification in conjunction with the drawings.

DESCRIPTION OF THE PREFERRED EMBODIMENT

Figure 1:
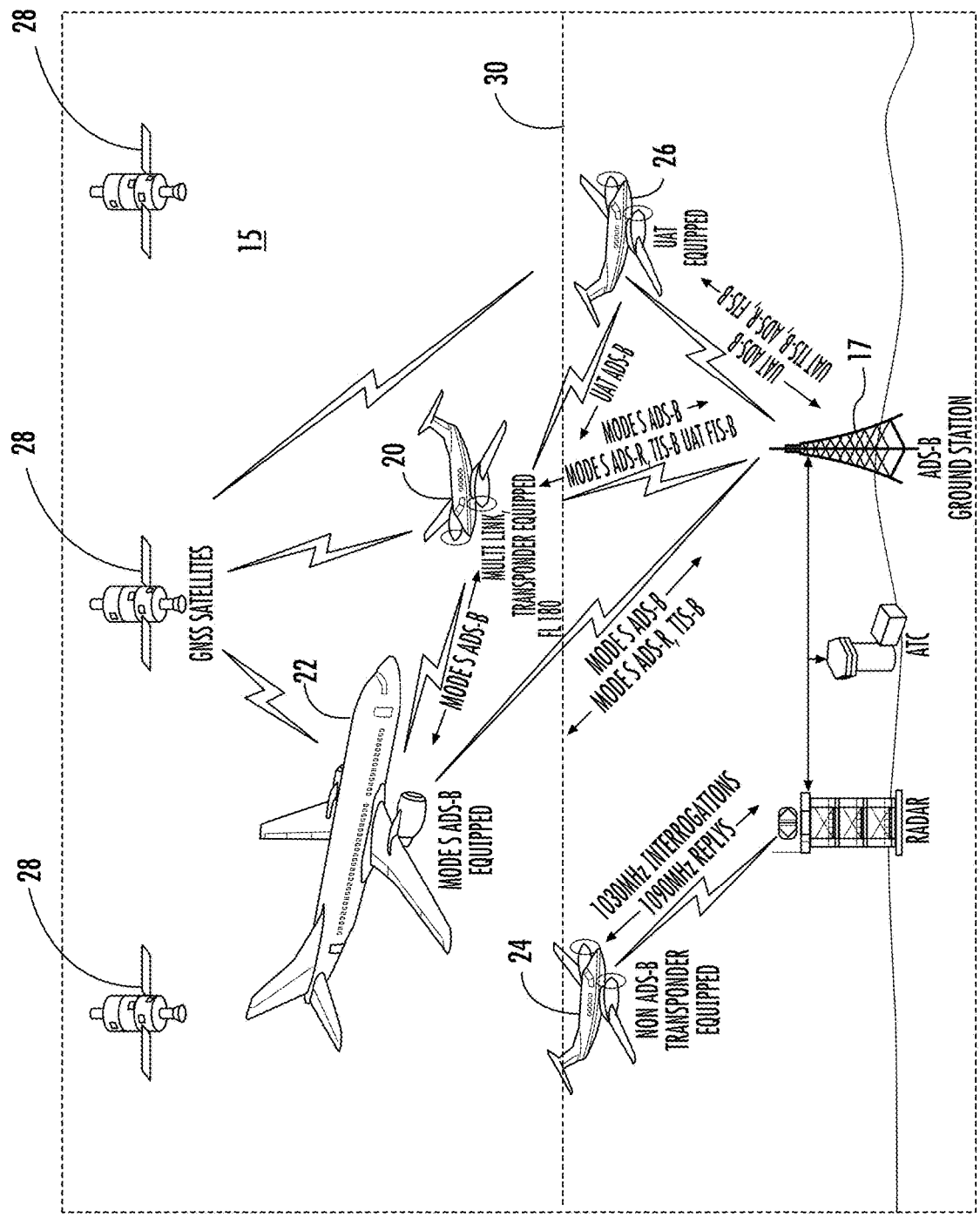
FIG. 1 is a diagram showing an ADS-B airspace system with a multi-link transponder equipped aircraft, according to an embodiment of the invention.
Figure 2:
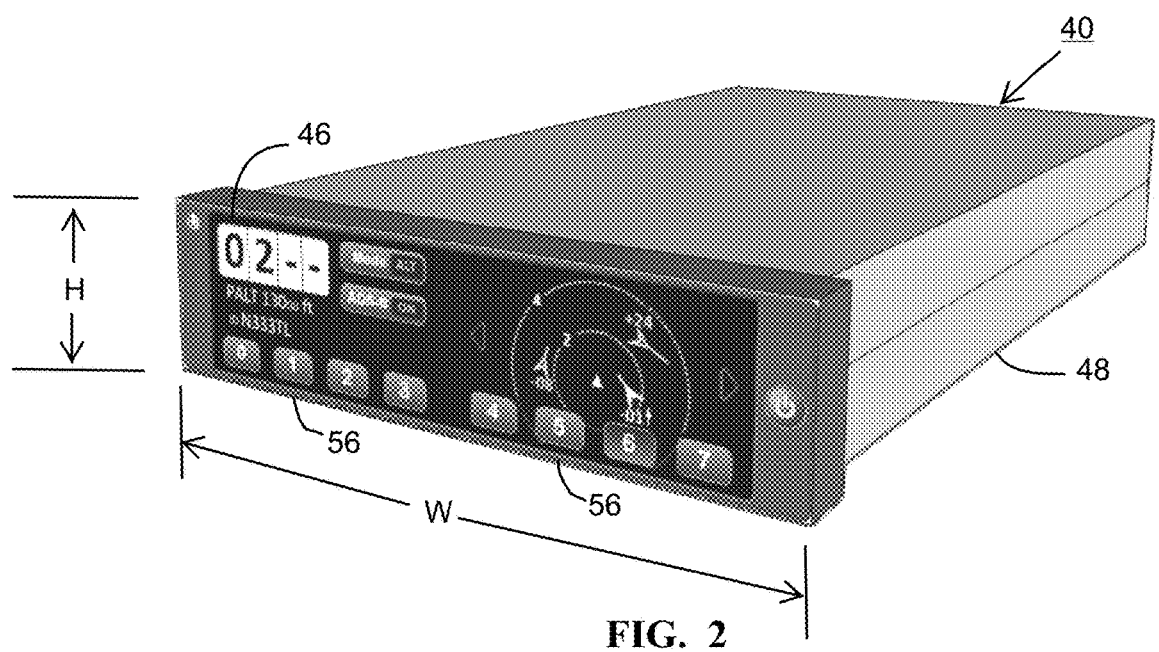
FIG. 2 is a perspective view taken from the front and side of a multi-link transponder, according to an embodiment of the invention.

Referring now to the drawings and the illustrative embodiments depicted therein, an ADS-B system 15 is operational with aircraft having transponder systems that are designed to different standards and rules depending on attributes like weight, propulsion, and operational use. System 15 has a ground station 17 that will receive the ADS-B broadcasts from aircraft on multiple frequencies and rebroadcast that information on the other frequency. For example, Mode S ADS-B messages from aircraft 22 will be retransmitted as a Universal Access Transceiver(UAT) ADS rebroadcast messages, also known as ADS-R messages. Also, UAT ADS-B messages from UAT equipped aircraft 26 will be rebroadcast as Mode S ADS-R messages. In addition, ground station 17 retransmits position reports from aircraft 24 that are not broadcasting ADS-B messages on either frequency, but are transponder equipped with a non-ADS-B transponder, such as an ATCRBS transponder, as TIS-B messages on both the Mode S and UAT frequencies. Ground station 17 does not form any part of the present invention. Aircraft 26 is limited to a flight level of 18,000 feet shown at 30. ADS-B system 15 additionally includes global navigation system satellites 28 that provide signals from which an aircraft can calculate its position.

ADS-B system 15 is also operational with an aircraft 20 equipped with an aircraft multi-link transponder 40 that is positioned within aircraft 20. Although not necessarily in all circumstances, multi-link transponder 40 may replace or retrofit a transponder, such as a Mode S ADS-B equipped transponder having a Mode S ADS-B transmitter, or the like. In the illustrated embodiment, multi-link transponder 40 includes a receiver 44 that provides the capability of receiving information pertaining to another aircraft, such as a Mode S Extended Squitter receiver that is capable of receiving ADS-R, TIS-B messages from ground station 17 as well as UAT ADS-B messages from UAT equipped aircraft 26, and mode S ADS-B messages from mode S equipped aircraft 22, and the like. Receiver 44 may be a UAT receiver that is capable of receiving ADS-R, TIS-B and Flight Information Services Broadcast (FIS-B) messages from ADS-B ground station 17.

Figure 14:
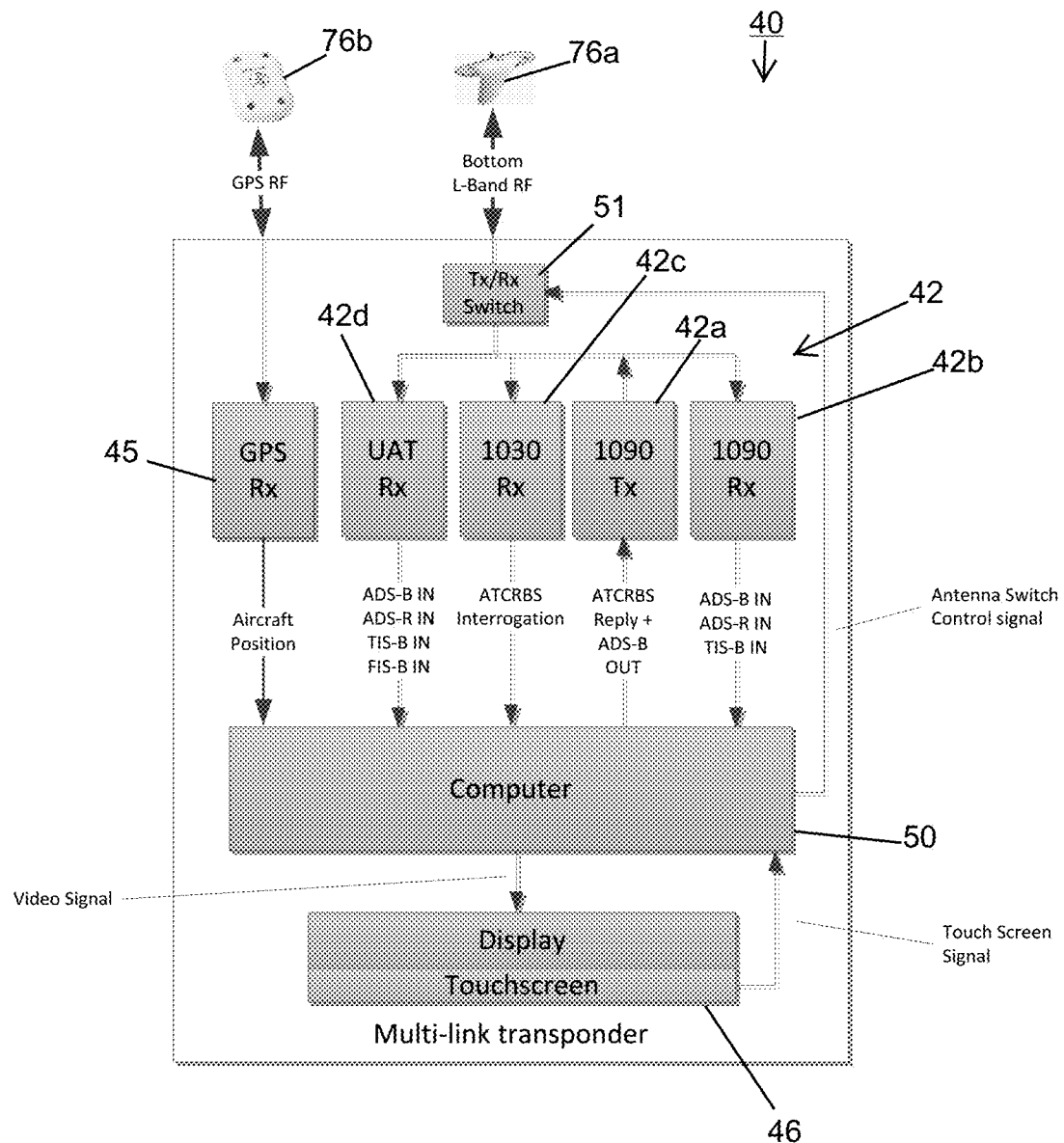
FIG. 14 is a more detailed block diagram of an embodiment of the multi-link transponder in FIG. 2.
Figure 15:
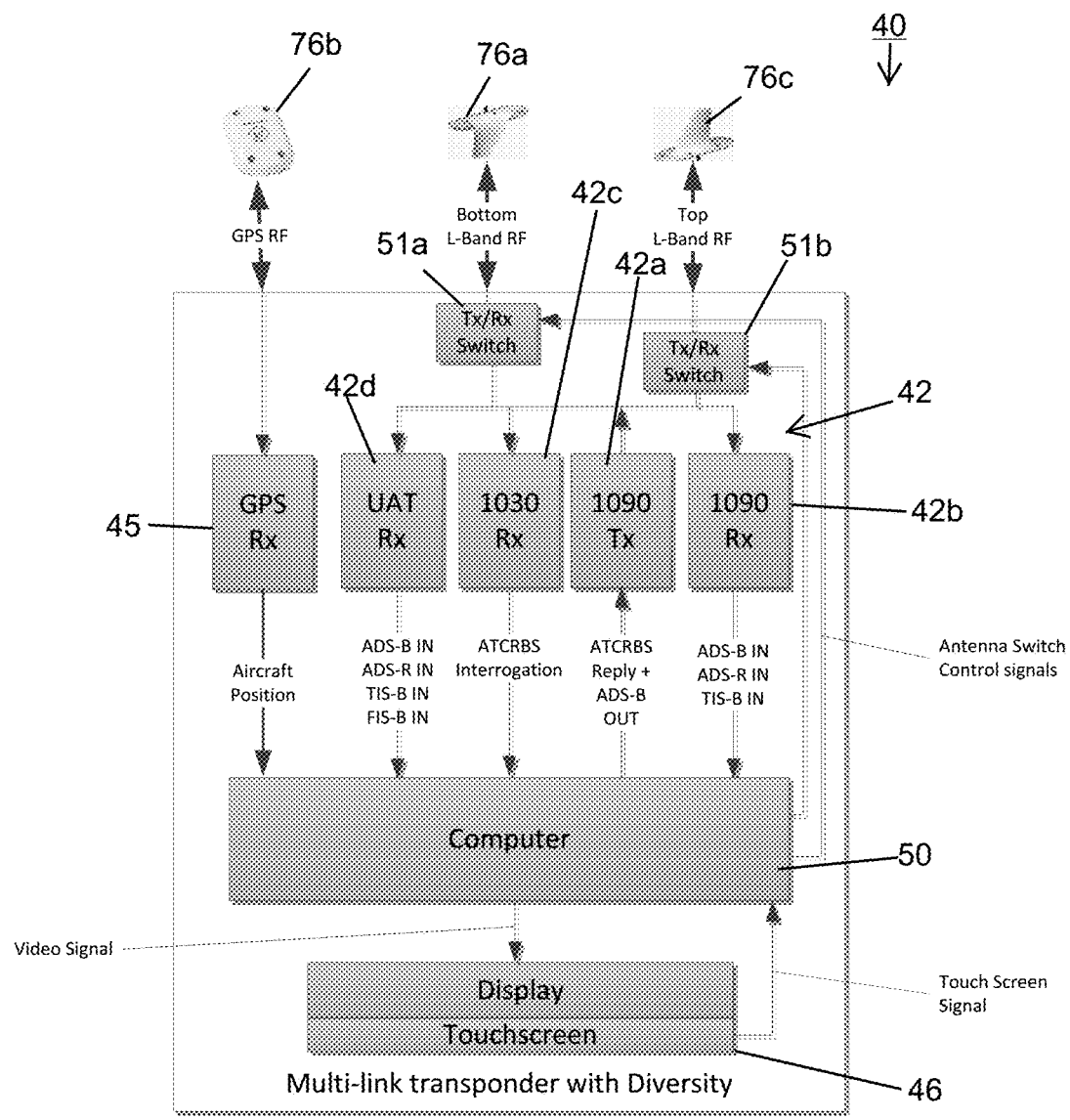
FIG. 15 is the same view as FIG. 14 of another embodiment thereof.
Figure 16:
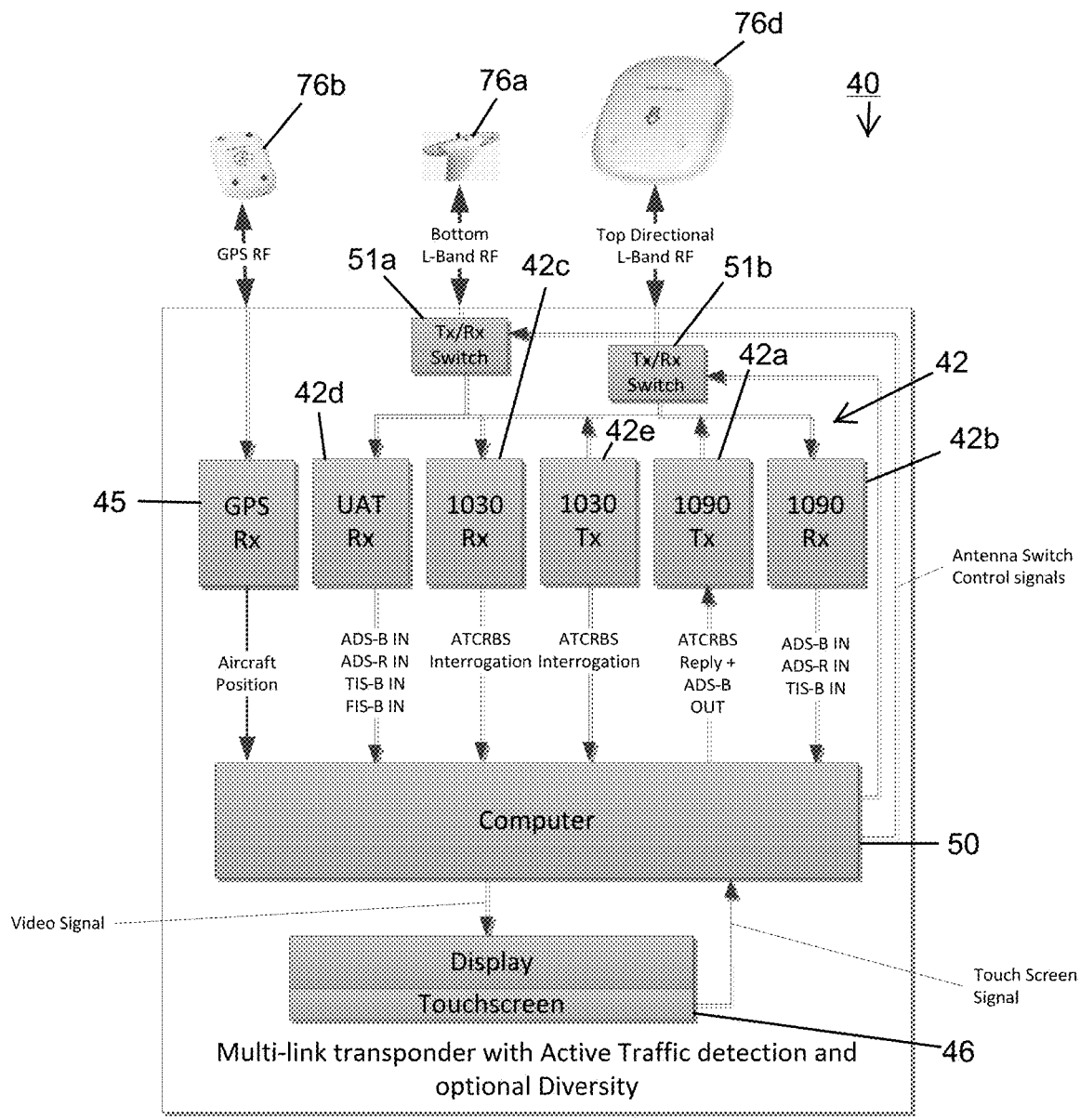
FIG. 16 is the same view as FIG. 14 of yet another embodiment thereof.

Multi-link transponder 40 further includes a transponder 42 such as that which is adapted to transmit information pertaining to aircraft 20 in which the transponder is positioned, such as a Mode S extended squitter or ATCRBS transmitter 42a operating at 1090 MHz. A receiver 42b operating at 1090 MHz is included that is capable of receiving ADS-B transmissions from other aircraft (FIGS. 14-16). Receiver 42b may additionally receive ADS-R signals and TIS-B signals broadcast from ground station 17. Transponder 42 may further include an ATCRBS interrogation signal receiver 42C that is capable of receiving an ATCRBS interrogation signal, for which transmitter 42a is capable of transmitting a response. Transponder 42 may additionally include a receiver 42d that is capable of receiving signals at the UAT frequency band of 978 MHz, such as ADS-B signals from a UAT equipped aircraft 26 and ADS-R, TIS-B and FIS-B signals from ground station 17. Multi-link transponder 40 may additionally include an integrated GNSS position source, such as a receiver 45 that is capable of determining a position of aircraft 20 in a three-dimensional space from signals received from GNSS satellites 28. Position source 45 operates according to principles well known in the art. While multi-link transponder 40 has been described with a plurality of receivers and transmitters operating at different frequency bands, this is by way of example only. The hardware necessary to carry out such functions may be formed, by way of example, from a frequency agile transceiver that is capable of being tuned to different frequency bands, and the like, under the control of a computer 50. Computer 50 also controls an electronic switch 51 that has different states depending on whether a transmitter is active or an incoming transmission is being received.

Figure 4:
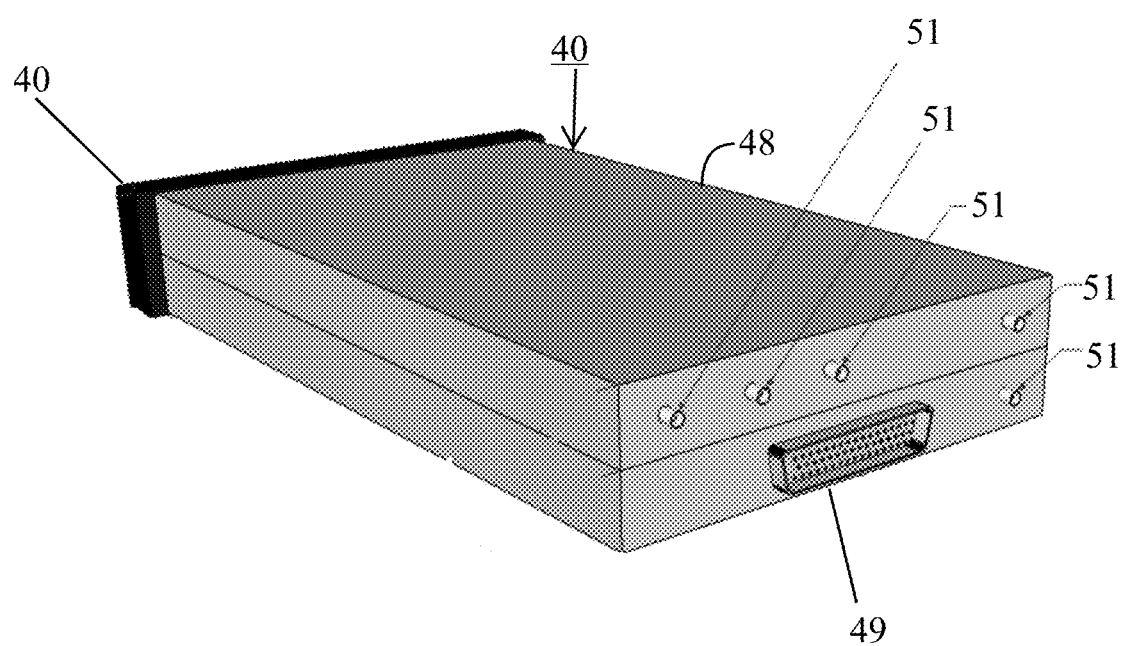
FIG. 4 is a perspective view taken from the side and rear of the multi-link transponder in FIG. 2.
Figure 5:
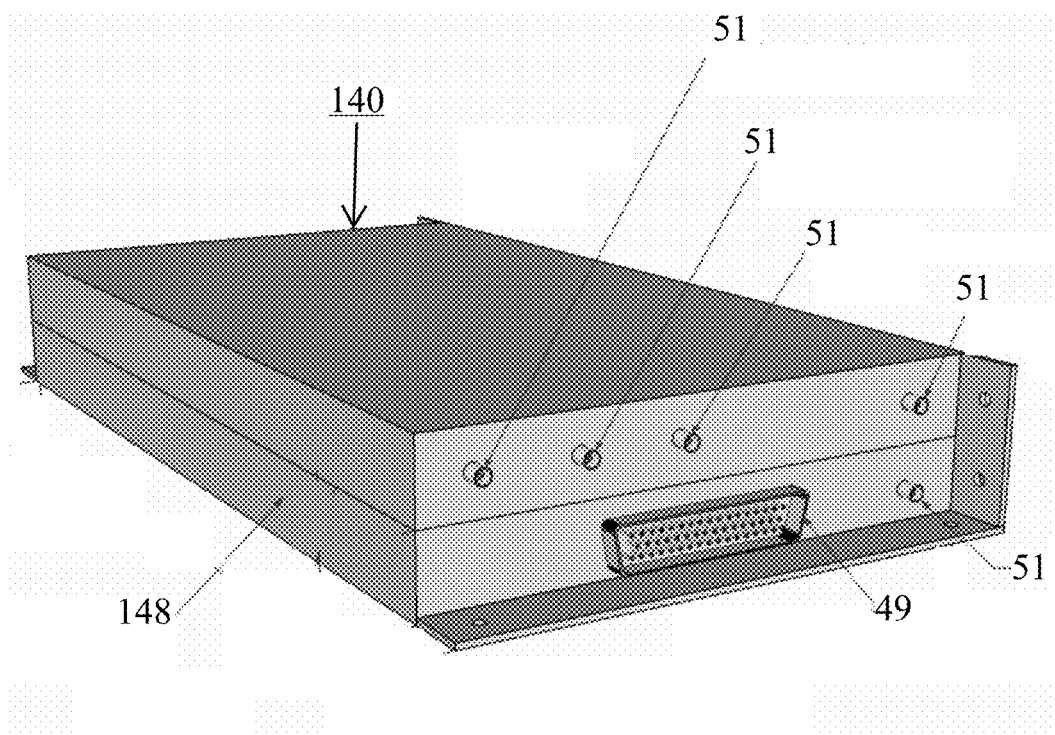
FIG. 5 is the same view as FIG. 4 of an alternative embodiment thereof.
Figure 6:
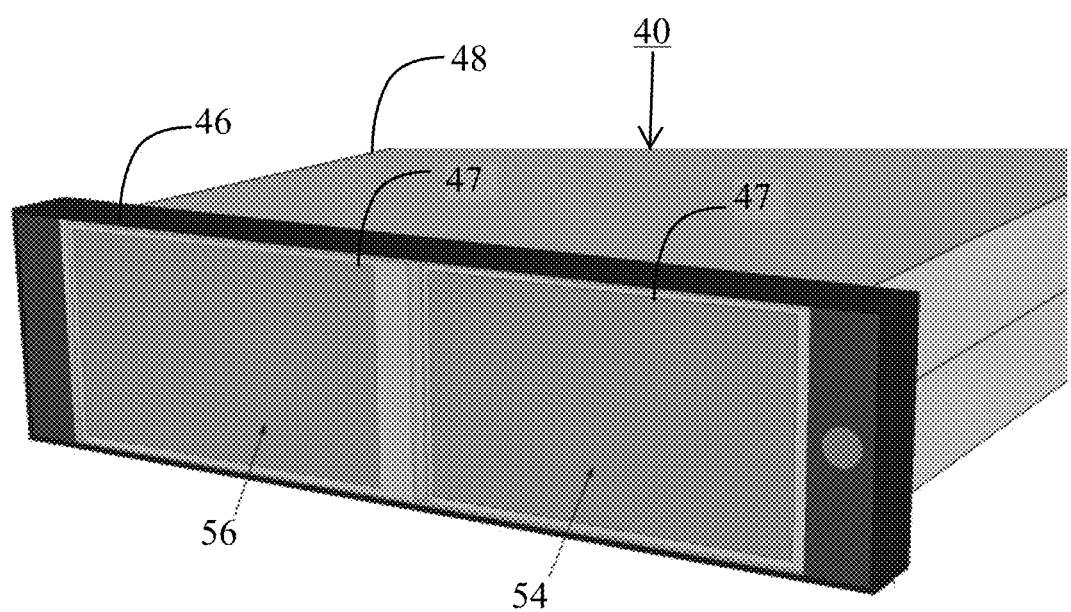
FIG. 6 is the same view as FIG. 2 illustrating details of the physical display with the over-glass removed to reveal details of the display.

Multi-link transponder 40, in the illustrated embodiment, includes a display 46, which may be a touch-screen display, such as a WQVGA touch screen LCD display, or the like. Display 46 is capable of displaying information received by receiver 44, information to guide user input selection of information transmitted by transponder 42, or both, as well as receiving user input selection via the touch function. Multi-link transponder 40 further includes a housing 48 that houses transponder 42, receiver 44 and display 46 (FIGS. 4 and 6). In the illustrated embodiment, housing 48 is configured to fit within a common transponder slot in an aircraft cockpit, such as a 6.25-inch wide opening, also known as MARK width panel. However, other dimensions are possible. Display 46 coincides with a side of housing 48 that is essentially the same shape as the standard transponder opening. Thus, display 46 has a width-to-height aspect ratio that is greater than 1:1 and may be at least approximately 2:1. In the illustrated embodiment, display 46, including its bezel, has a width (W) of 6.25 inches, although other dimensions are possible. Display 46, in the illustrated embodiment, is defined by a pair of side-by-side rectangular WQVGA touch screen LCD display panels 47 behind an over-glass (not shown in FIG. 6). Alternatively, two logical display areas could be defined on a single physical display to provide sides 54 and 56 of display 46 as defined below. An alternative embodiment of a multi-link transponder 140 may be used with a separate display. Transponder 140 may have a housing 148 with the same overall configuration as housing 48, but with an attachment plate (not shown) in place of display 46.

Housings 48 and 148 are provided with an I/O connector 49 to interface with various aircraft bus and standard equipment. A plurality of antenna connectors 51 are illustrated on housing 48, 148. However, housing 48, 148 will be equipped with only the antenna connectors required for the functions of the particular configuration of multi-link transponder 40, 140.

Figure 7:
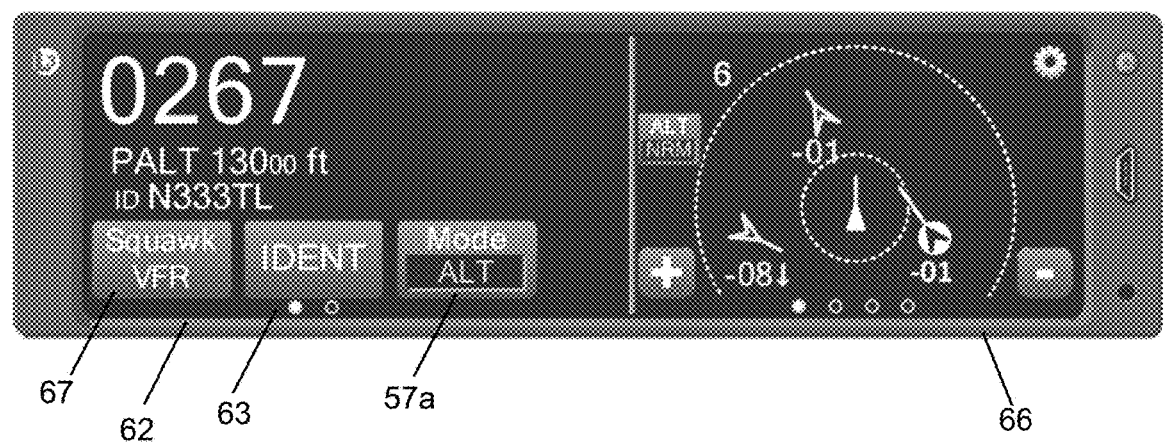
FIG. 7 is a front elevation of the multi-link transponder in FIG. 2 illustrating a display for the transponder function and an application display for other functions.
Figure 8:
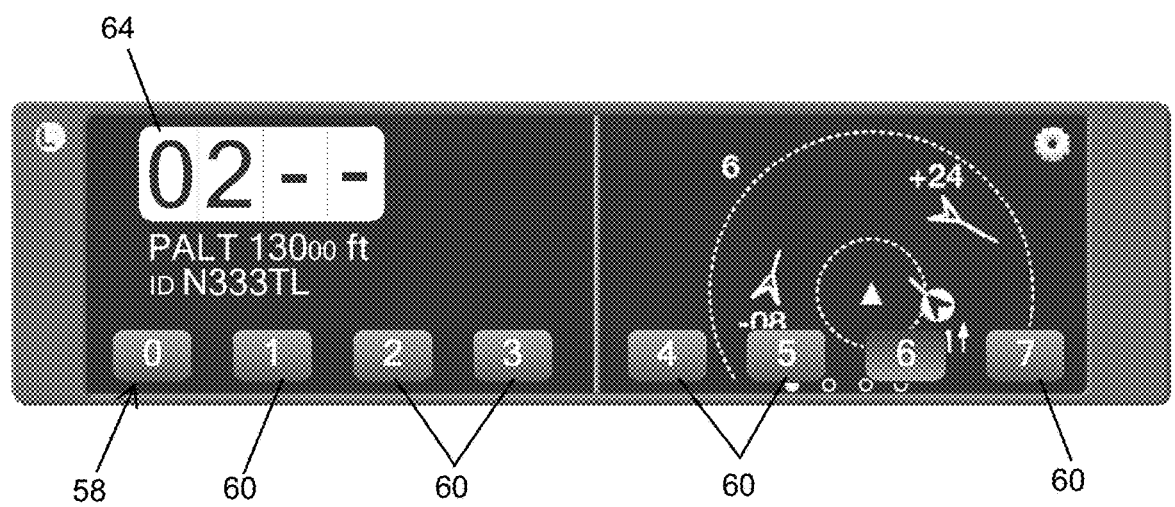
FIG. 8 is the same view as FIG. 7 illustrating numeric soft keys for user input selection of a transponder code.

Display 46 is driven by a controller, such as computer 50, to depict information received by receiver 44 on an application/configuration screen 66 on one side 54 of the display and a transponder mode control screen 67 to depict information to guide user input selection of information transmitted by transponder 42 on another side 56 of the display. Display 46 is controlled to display various static keys, such as a transponder mode control key 57a that is constantly displayed even though it is software defined. Display 46 is also controlled to display various temporary soft keys 58 that are selectively displayed depending on the mode of multi-link transponder 40. An example of soft keys 58 are selectively depicted numeric entry keys 60, shown as digits 0 through 7, which are only displayed when display 46 is in a mode to receive user selection of information transmitted by transponder 42, such as a transponder code. This transponder code entry mode may be a display and touch area 64 which the pilot touches. This results in transponder code selection via numeric keys 60 being displayed as can be seen by comparing drawing FIGS. 7 and 8. As the pilot touches numeric keys 60, the numbers are displayed by numeric display and touch area 64, with dashes indicating digits that remain to be entered. When all of the digits of the transponder code have been entered, controller 50 extinguishes numeric keys 60 and displays VFR code selection key 62 and an IDENT mode button 63 that activates a Special Position Indication (SPI) pulse. In the illustrated embodiment, numeric entry keys 60 extend widthwise across display 46 when in the transponder code edit mode. This allows the keys to be large and well spaced apart, thereby facilitating their use notwithstanding the relatively small size of the display.

Figure 9:
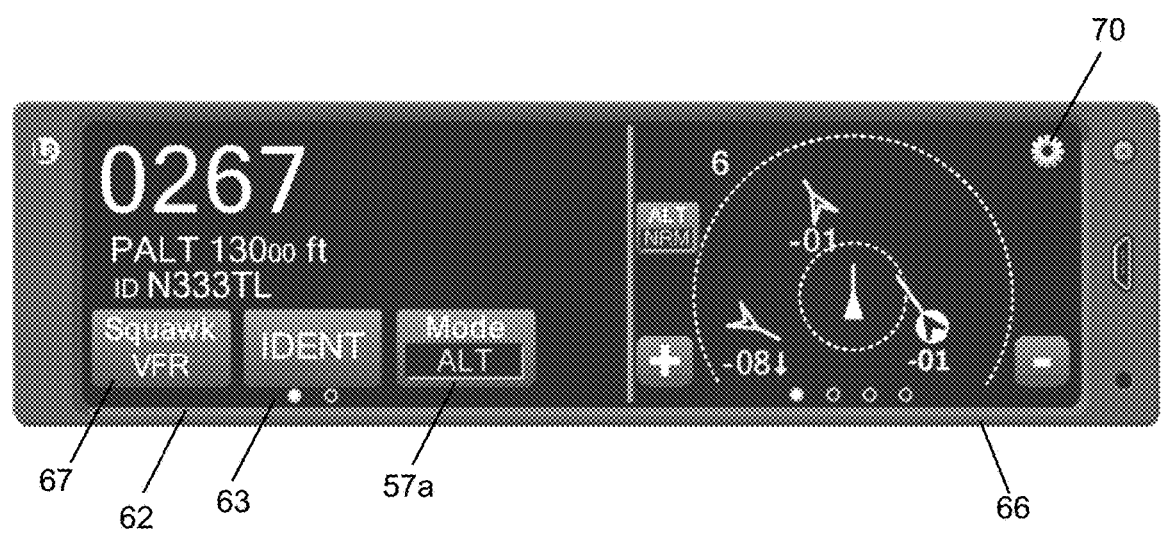
FIG. 9 is the same view as FIG. 7 illustrating display of transponder function and an application screen displaying ADS-B traffic functions.
Figure 10:
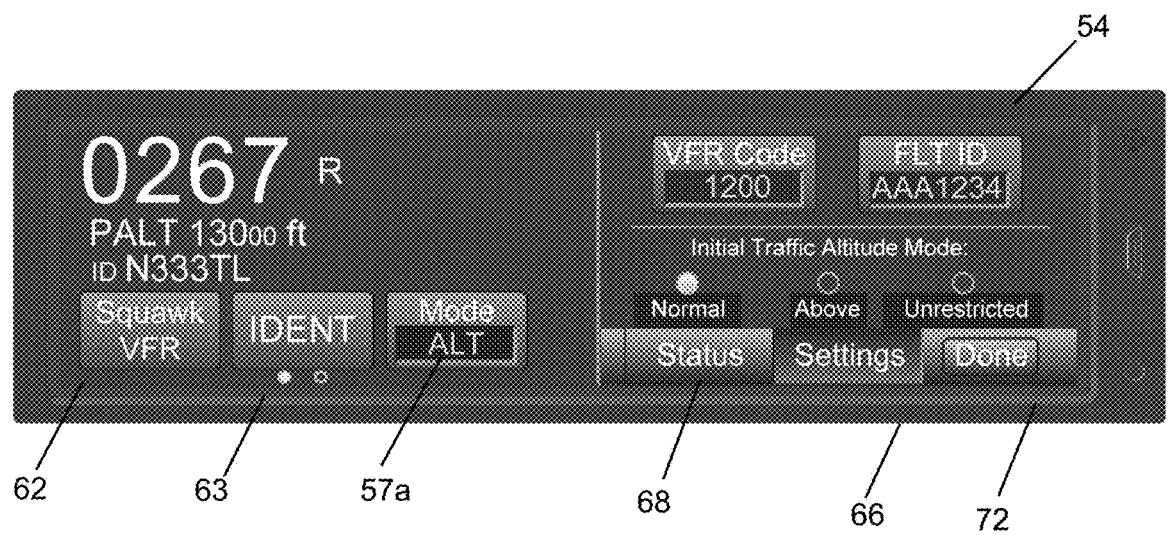
FIG. 10 is the same view as FIG. 7 illustrating a configuration screen for option selection for the ADS-B traffic display.

As previously described, receiver 42 may include a plurality of receivers 42b, 42c and 42d, each for receiving different types of data, or a frequency agile receiver that is capable of being tuned to frequency bands of interest. Examples of such data may include air traffic data of the type received by an ADS-B receiver, weather data of the type received by a FIS-B weather receiver, and the like. Of course, a greater or lesser number of receivers and/or data may be included. Display 46 is driven by a controller, such as a computer 50 to selectively depict information received by one of such receivers on application screen 66. For example, reference is made to FIG. 9 in which side 54 of the display is illustrated depicting an application screen 66 depicting application data, such as air traffic data received by an ADS-B receiver. The application displayed by application screen 66, in the illustrated embodiment, can be switched by a horizontal swiping motion across screen 66. Once the swiping motion is detected, the displayed application will transition in a smooth sliding animation between the current and next application screen. The information displayed on application screen 66 can be configured by a configuration screen 68 shown displayed on side 54 of the display in FIG. 10. This configuration screen can be accessed by tapping an options icon 70 on application screen 66. When the desired configuration is selected, the pilot taps a "Done" button 72. The configuration screen then transitions out of view and the application screen 66 is once again displayed.

Figure 11:
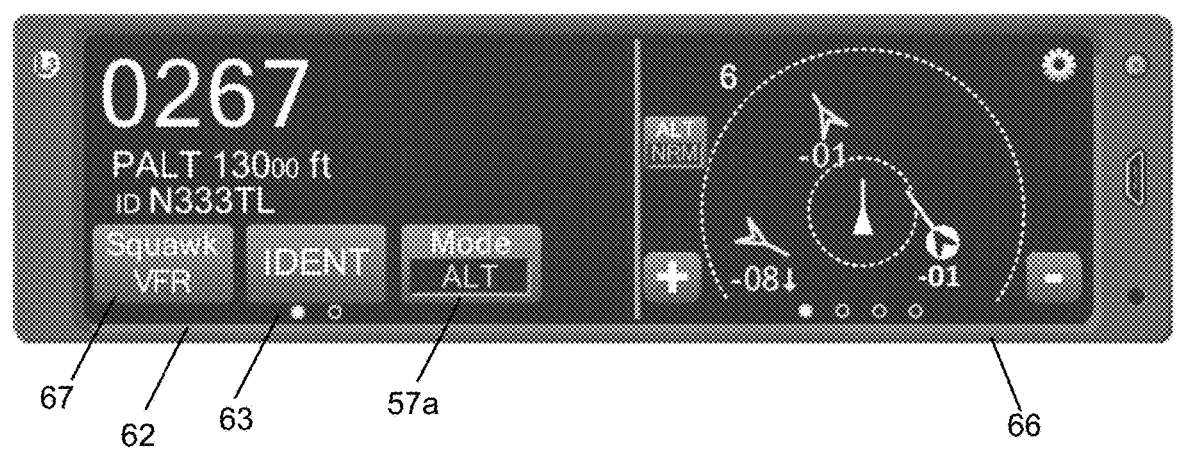
FIG. 11 is the same view as FIG. 7 illustrating a display of traffic information on the application screen which includes active and/or passive traffic information.

FIG. 11 illustrates further functions that can be incorporated into Multi-link transponder 40. For example, instead of, or in addition to, traffic control data being received from an ADS-B receiver, active traffic data from a conventional Traffic Collision Avoidance System (TCAS I or TAS) may be incorporated into transponder 40. Transponder 40 fuses or blends the active and passive traffic data, chooses which traffic data to display, or the like. The active traffic data from the TCAS I or TAS system instead of, or in addition to, the passive data received from the ADS-B system is especially useful in situations such as where ADS-B data is not available or where more frequently updated traffic data is desired, such as in the vicinity of airports, or the like. By incorporating the TCAS I or TAS system into multi-link transponder 40, it may, alternatively, be possible to eliminate a separate avionic system including display from the cockpit. This has the additional advantage of reducing aircraft weight.

Figure 12:
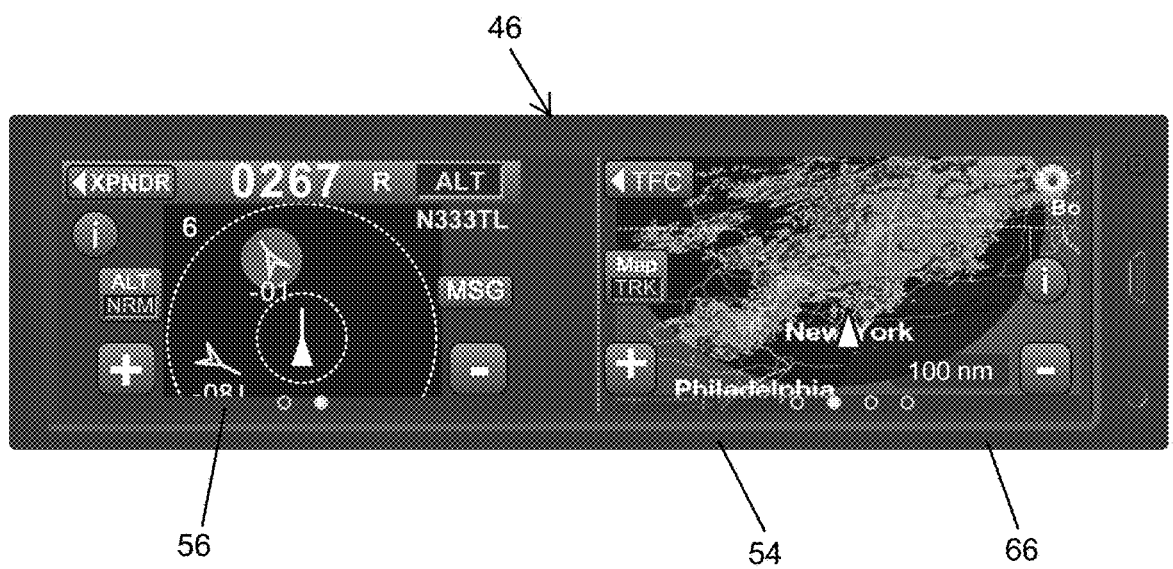
FIG. 12 is the same view as FIG. 7 illustrating display of weather information on the application screen.
Figure 13:
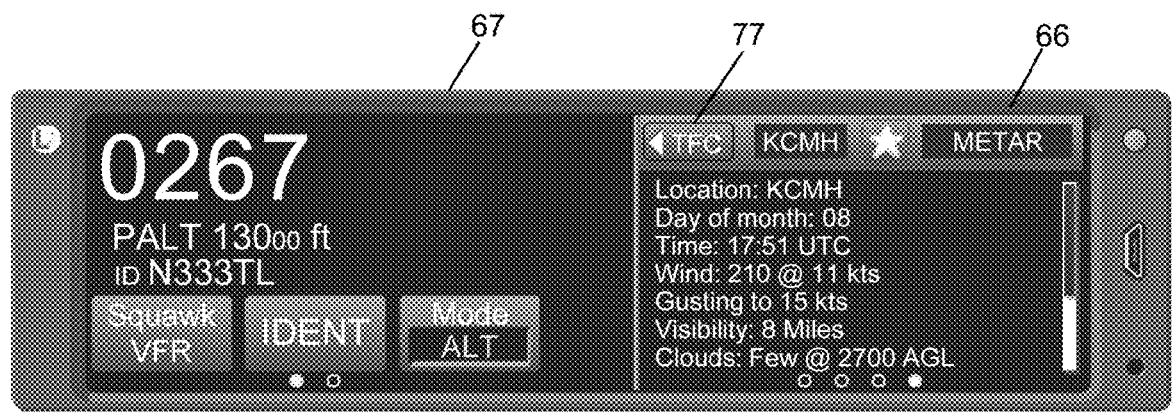
FIG. 13 is the same view as FIG. 7 illustrating textual weather data on the application screen.

FIG. 12 illustrates weather data, such as NEXRAD weather data, or the like, being displayed on application screen 66 on side 54 of display 46. Conveniently, both traffic control data and the transponder code selected may be combined in the display on the another side 56 of display 46. Such weather data may be obtained, for example, from FIS-B data received from ground station 17. A button 77 (TFC) allows quick return to the traffic application.

Multi-link transponder 40 is capable of operating from a variety of antenna configurations. FIG. 14 illustrates one configuration in which multi-link transponder interfaces with a sole L-Band antenna 76a that is positioned on the underside of the aircraft. Another GPS antenna 76b is provided if an optional GPS input is used. FIG. 15 includes a redundant L-Band antenna 76c that is mounted on the topside of the aircraft in order to provide antenna spacial diversity which is especially useful for large aircraft where the body of the aircraft may block signals from above the aircraft reaching antenna 76*a* on the bottom of the aircraft in combination with another transmit/receive switch 51*b*. In yet an additional embodiment illustrated in FIG. 16, a directional antenna 76*d* may be used on the top or bottom of the aircraft of the type that is usable for active traffic, such as for TCAS, or the like. Such antenna may be used to supply active traffic data to multi-link transponder 40 as well as to provide antenna spacial diversity for other L-band functions performed by multi-link transponder 40. Another transmitter 42*e* may be provided that transmits ATCRBS interrogation signals, such as at 1030 MHz via directional antenna 76*d*. Transponder 40 can also share existing aircraft antenna, such as one that supports GPS, or the like. In such case, an antenna diplexer may be used.

Figure 3:
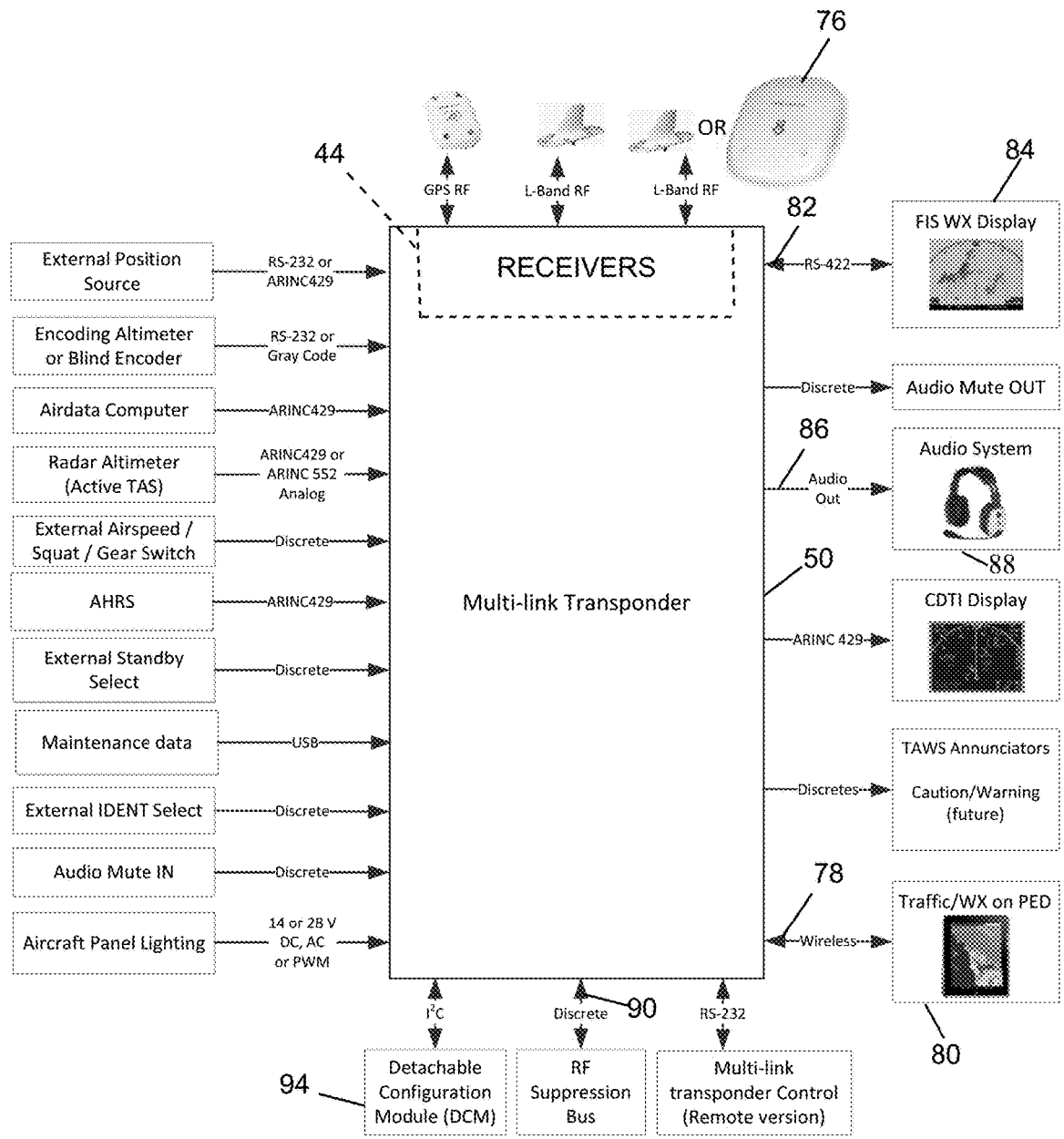
FIG. 3 is a block diagram of an electronic system for the multi-link transponder in FIG. 2.

Multi-link transponder 40, 140 may receive various other inputs and produce various other outputs. For example, it may produce a display signal at wireless output, such as a Bluetooth and/or wireless fidelity (WiFi) output 78 that can be supplied to a personal digital device 80. This allows the images depicted on display 46 to be conveniently viewed in other areas of the aircraft or cockpit. Multi-link transponder 40, 140 may also provide an output 82 that could be displayed on a conventional FIS display 84, an audio output 86 for providing audio to a pilot's headphones 88, as well as various other display and annunciator functions as illustrated in FIG. 3. Also, multi-link transponder 40 may include an RF suppression bus input 90 which is a conventional bus that informs transponder 40, 140 that another device on the aircraft is transmitting so that such transmission is not confused with a return signal, such as from a DME or from a from TCAS I system and also to ensure that no more than one transmitter is operating at the same time.

Transponder 40 may also have an input to receive data from a memory device 94. In addition to providing various configuration data, data may be stored on a memory device 94. A TAWS flight crew alerting function can be displayed by display 46. Other inputs and outputs may be provided as shown in FIG. 3.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A multi-link transponder adapted for mounting in an aircraft, the multi-link transponder comprising:
    a first transponder transmitter configured to responsively transmit transponder information pertaining to the aircraft in which the transponder is positioned in response to an interrogation signal;
    a second transponder transmitter configured to periodically transmit ADS-B Out data pertaining to the aircraft in which the transponder is positioned;
    at least one receiver configured to receive data transmissions from a ground station and another aircraft, wherein the at least one receiver is further configured to receive different types of data on multiple different frequencies;
    a controller configured to produce the ADS-B Out data as defined by aircraft information from the equipped aircraft, and further configured to produce the transponder information responsive to the at least one receiver and as defined by aircraft information from the equipped aircraft;
    a display configured to display information received by the at least one receiver and information to guide user input selection of information transmitted by the first transponder and the second transponder; and
    a housing that houses the first and second transponder transmitters, the at least one receiver, the controller, and the display,
    wherein the at least one receiver comprises a Universal Access Transceiver (UAT) receiver configured to receive data from a ground station and from a UAT equipped aircraft, and wherein the at least one receiver further comprises an extended squitter receiver configured to receive data from an aircraft equipped with an extended squitter transmitter.

2. The multi-link transponder as claimed in claim 1, wherein the first and second transponder transmitters are a same transponder transmitter.

3. The multi-link transponder as claimed in claim 1, wherein the housing is adapted to fit within a MARK width transponder slot in an aircraft cockpit.

4. The multi-link transponder as claimed in claim 1 further comprising a global navigation system position source, wherein the ADS-B Out data is depicted with respect to position information from the global navigation system position source.

5. The multi-link transponder as claimed in claim 1, wherein the first transponder transmitter is configured to function as one of a Mode S transponder and an ATCRBS transponder, and wherein the second transponder transmitter is configured to function as a Mode S transponder.

6. The multi-link transponder as claimed in claim 1, wherein the UAT receiver receives ADS-B data, ADS-R data, TIS-B data, and FIS-B data.

7. The multi-link transponder as claimed in claim 1, wherein the UAT receiver is adapted to receive data in a 978 MHz frequency band.

8. The multi-link transponder as claimed in claim 1, wherein the extended squitter receiver is adapted to receive data in a 1090 MHz frequency band.

9. The multi-link transponder as claimed in claim 1, wherein the controller is further configured to produce a display output to be received by the display, wherein the display output is derived from information received by the at least one receiver, wherein the controller has a dual display mode in which the display output causes the display to depict information derived from the at least one receiver on one portion of the display and to depict information used to guide input selection of information transmitted by the first transponder transmitter on another portion of the display.

10. The multi-link transponder as claimed in claim 9, wherein the portions are laterally disposed across the display.

11. The multi-link transponder as claimed in claim 10, wherein the display comprises a touch screen.

12. The multi-link transponder as claimed in claim 11, wherein the controller in a data entry mode receives user selection of information to be transmitted by the first transponder transmitter, and causes the display output to display numeric touch entry keys across all of the display.

13. The multi-link transponder as claimed in claim 12, wherein all of the numeric touch entry keys extend lengthwise across the display in a single row when the controller is in the data entry mode.

14. The multi-link transponder as claimed in claim 10 further comprising a global navigation system position source, wherein the display output derived from the at least one receiver is depicted with respect to position information from the global navigation system position source.

15. An aircraft transponder system that is adapted to be positioned in an aircraft, comprising:
a transponder comprising a first transponder transmitter configured to responsively transmit transponder information pertaining to the aircraft in which the transponder is positioned in response to an interrogation signal, a second transponder transmitter configured to periodically transmit ADS-B Out data pertaining to the aircraft in which the transponder is positioned;
a global navigation system position source, wherein the ADS-B Out data is depicted with respect to position information from the global navigation system position source;
at least one receiver configured to receive data transmissions from a ground station and another aircraft, wherein the at least one receiver is further operable configured to receive different types of data on multiple different frequencies;
a controller configured to produce the ADS-B Out data as defined by aircraft information from the equipped aircraft, and further configured to produce the transponder information responsive to the at least one receiver and as defined by aircraft information from the equipped aircraft;
a display configured to display information received by the at least one receiver and information to guide user input selection of information transmitted by the first transponder and the second transponder; and
a housing that houses the transponder, the global navigation system position source, the at least one receiver, the controller, and the display;
wherein the at least one receiver comprises a Universal Access Transmitter (UAT) receiver configured to receive data from a ground station and from a UAT equipped aircraft, and wherein the at least one receiver further comprises an extended squitter receiver configured to receive data from an aircraft equipped with an extended squitter transmitter.

16. The transponder system as claimed in claim 15, wherein the first and second transponder transmitters are a same transponder transmitter.

17. The transponder system as claimed in claim 16, wherein the housing is adapted to fit within a MARK width transponder slot in an aircraft cockpit.

18. The transponder system as claimed in claim 15, wherein the first transponder transmitter is configured to function as one of a Mode S transponder and an ATCRBS transponder, and wherein the second transponder transmitter is configured to function as a Mode S transponder.

19. The transponder system as claimed in claim 15, wherein the UAT receiver receives ADS-B data, ADS-R data, TIS-B data, and FIS-B data.

20. An aircraft transponder system that is adapted to be positioned in an aircraft, comprising:
a transponder comprising a first transponder transmitter configured to responsively transmit transponder information pertaining to the aircraft in which the transponder is positioned in response to an interrogation signal, a second transponder transmitter configured to periodically transmit ADS-B Out data pertaining to the aircraft in which the transponder is positioned;
a global navigation system position source, wherein the ADS-B Out data is depicted with respect to position information from the global navigation system position source;
at least one receiver configured to receive data transmissions from a ground station and another aircraft, wherein the at least one receiver is further operable configured to receive different types of data on multiple different frequencies;
a controller configured to produce the ADS-B Out data as defined by aircraft information from the equipped aircraft, and further configured to produce the transponder information responsive to the at least one receiver and as defined by aircraft information from the equipped aircraft;
a display configured to display information received by the at least one receiver and information to guide user input selection of information transmitted by the first transponder and the second transponder; and
a housing that houses the transponder, the global navigation system position source, the at least one receiver, the controller, and the display;
wherein the at least one receiver is defined by a frequency agile receiver.

21. The transponder system as claimed in claim 15, wherein the UAT receiver is adapted to receive data in a 978 MHz frequency band.

22. The transponder system as claimed in claim 15, wherein the extended squitter receiver is adapted to receive data in a 1090 MHz frequency band.

23. The transponder system as claimed in claim 15, wherein the controller is further configured to produce a display output to be received by the display, wherein the display output is derived from information received by the at least one receiver, wherein the controller has a dual display mode in which the display output causes the display to depict information derived from the at least one receiver on one portion of the display and to depict information used to guide input selection of information transmitted by the first transponder transmitter on another portion of the display.

24. The transponder system as claimed in claim 23, wherein the portions are laterally disposed across the display.

25. The transponder system as claimed in claim 24, wherein the display comprises a touch screen.

26. The transponder system as claimed in claim 25, wherein the controller in a data entry mode receives user selection of information to be transmitted by the first transponder transmitter, and causes the display output to display numeric touch entry keys across all of the display.

27. The transponder system as claimed in claim 26, wherein all of the numeric touch entry keys extend lengthwise across the display in a single row when the controller is in the data entry mode.

28. The transponder system as claimed in claim 23, wherein the display output derived from the at least one receiver is depicted with respect to position information from the global navigation system position source.

* * * * *